(12) United States Patent
Yoshida et al.

(10) Patent No.: US 11,174,179 B2
(45) Date of Patent: Nov. 16, 2021

(54) FLOCCULANT, FILTER, AND WASTE LIQUID TREATING METHOD

(71) Applicant: DISCO CORPORATION, Tokyo (JP)

(72) Inventors: Miki Yoshida, Tokyo (JP); Kei Mine, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 217 days.

(21) Appl. No.: 16/388,250

(22) Filed: Apr. 18, 2019

(65) Prior Publication Data

US 2019/0322555 A1 Oct. 24, 2019

(30) Foreign Application Priority Data

Apr. 20, 2018 (JP) .............................. JP2018-081077

(51) Int. Cl.
| | | |
|---|---|---|
| *C02F 1/56* | (2006.01) | |
| *C02F 1/26* | (2006.01) | |
| *C02F 1/42* | (2006.01) | |

(52) U.S. Cl.
CPC ................. *C02F 1/56* (2013.01); *C02F 1/26* (2013.01); *C02F 1/42* (2013.01); *C02F 2201/002* (2013.01); *C02F 2303/26* (2013.01)

(58) Field of Classification Search
CPC ....................................................... C02F 1/56
See application file for complete search history.

(56) References Cited

U.S. PATENT DOCUMENTS 6,338,784 B1 * 1/2002 Terada ................... B01D 61/48
                                                              204/632
7,981,297 B2 * 7/2011 Sauvignet ............... C02F 1/004
                                                              210/666

FOREIGN PATENT DOCUMENTS

| JP | 2011041878 A | * | 3/2011 | ................ C02F 1/42 |
| JP | 2011041878 A | | 3/2011 | |

* cited by examiner

*Primary Examiner* — Peter Keyworth
(74) *Attorney, Agent, or Firm* — Greer, Burns & Crain, Ltd.

(57) ABSTRACT

A flocculant for treating a processing waste liquid into fresh water being formed by pulverizing an ion exchange resin for purification of fresh water into pure water to a size of 100 μm or below. With the ion exchange resin pulverized and used as a flocculant, it is ensured that even when the processing waste liquid is subjected to flocculation and separation, the fresh water separated from the processing debris does not show an increased electric conductivity, and worsening of water quality can be restrained. In addition, since the flocculant is pulverized down to a size of 100 μm or below, flocculation of the processing debris is promoted.

5 Claims, 5 Drawing Sheets

FLOCCULANT, FILTER, AND WASTE LIQUID TREATING METHOD

BACKGROUND OF THE INVENTION

Field of the Invention

The present invention relates to a flocculant, a filter, and a waste liquid treating method, for flocculation of impurities in a waste liquid.

Description of the Related Art

A processing apparatus such as a cutting apparatus and a grinding apparatus is used for cutting or grinding of a workpiece. In these processing apparatuses, the workpiece is processed while supplying pure water as processing water, in order to prevent impurities from adhering to devices. The pure water used in the processing apparatus amounts to 4 to 30 liters per minute, and, therefore, there is a demand for recycle of the pure water. To meet the demand, there has been developed a pure water purification apparatus for purifying pure water from a processing waste liquid (see, for example, Japanese Patent Laid-Open No. 2011-041878). In the pure water purification apparatus described in Japanese Patent Laid-Open No. 2011-041878, processing debris are removed from a processing waste liquid by a filtration filter, and the processing waste liquid is made to pass through an ion exchange resin filter, whereby pure water is purified.

SUMMARY OF THE INVENTION

However, in the case of a processing waste liquid with processing debris mixed therein in a high concentration, there has been a problem that if the processing waste liquid is returned to the pure water purification apparatus as it is, the filtration filter in the pure water purification apparatus would be clogged with the processing debris in a short time. On the other hand, it may be contemplated to combine flocculation and separation of a processing waste liquid with recycle of pure water, such as to subject the processing waste liquid to flocculation and separation into the processing debris and fresh water, before returning to the pure water purification apparatus. However, there has been a problem that when a commercialized flocculant is used, a component of the flocculant would be eluted into the fresh water after flocculation and separation, resulting in a rise in electric conductivity. Therefore, even when the fresh water after flocculation and separation is returned to the pure water purification apparatus, the ion exchange resin filter in the pure water purification apparatus would be consumed in a short time.

It is therefore an object of the present invention to provide a flocculant, a filter, and a waste liquid treating method by which pure water can be purified while suppressing consumption of a filter, even in the case of a processing waste liquid high in the concentration of processing debris.

In accordance with an aspect of the present invention, there is provided a flocculant for treating a processing waste liquid, in which processing debris generated by processing are mixed in pure water supplied at a time of processing by a processing apparatus, into fresh water. The flocculant is formed by pulverizing an ion exchange resin for purifying fresh water into pure water to a size of 100 μm or below.

According to this configuration, the ion exchange resin for purification of fresh water into pure water is pulverized to be used as a flocculant, whereby it is ensured that no component of the flocculant is eluted into the fresh water. Therefore, even when the processing waste liquid is subjected to flocculation and separation before returning to a pure water purification apparatus, the fresh water separated from the processing debris would not show a raised electric conductivity, and, therefore, consumption of the ion exchange resin filter in the pure water purification apparatus can be restrained. In addition, since the flocculant is formed through pulverization to a size of 100 μm or below, flocculation of the processing debris can be promoted.

In accordance with another aspect of the present invention, there is provided a filter for subjecting a processing waste liquid to filtration and ion exchange to purify the processing waste liquid into pure water, the filter formed by alternatively stacking: a mixed layer for filtration of the processing waste liquid, the mixed layer formed by mixing a flocculant obtained by pulverizing an ion exchange resin for purifying fresh water into pure water to a size of 100 μm or below into an ion exchange resin; and an ion exchange resin layer purifying the fresh water filtered by the mixed layer into pure water.

Preferably, the mixed layer is formed by packing with the flocculant in such a manner that a content of the flocculant gradually increases from an inflow side toward an outflow side of the processing waste liquid.

In accordance with a further aspect of the present invention, there is provided a waste liquid treating method for purifying a processing waste liquid, in which processing debris generated by processing are mixed in pure water supplied at a time of processing by a processing apparatus, into pure water. The waste liquid treating method includes: a flocculant addition step of adding a flocculant obtained by pulverizing an ion exchange resin for purification of fresh water into pure water to a size of 100 μm or below to a stirring tank in which a processing waste liquid discharged from the processing apparatus is accommodated; a solid-liquid separation step of separating the processing waste liquid containing flocculated flocs of the processing debris flocculated by the flocculant into the flocculated flocs and fresh water in a precipitation tank, after the flocculant addition step is performed; a fresh water transfer step of transferring the fresh water separated in the solid-liquid separation step to a pure water purification apparatus; a pure water purification step of purifying the fresh water transferred in the fresh water transfer step into pure water in the pure water purification apparatus; and a pure water transfer step of transferring the pure water purified in the pure water purification step to the processing apparatus.

According to the present invention, the ion exchange resin for purification of fresh water into pure water is pulverized to be used as a flocculant, whereby it is ensured that pure water can be purified while restraining consumption of a filter, even in the case of a processing waste liquid high in the concentration of processing debris.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
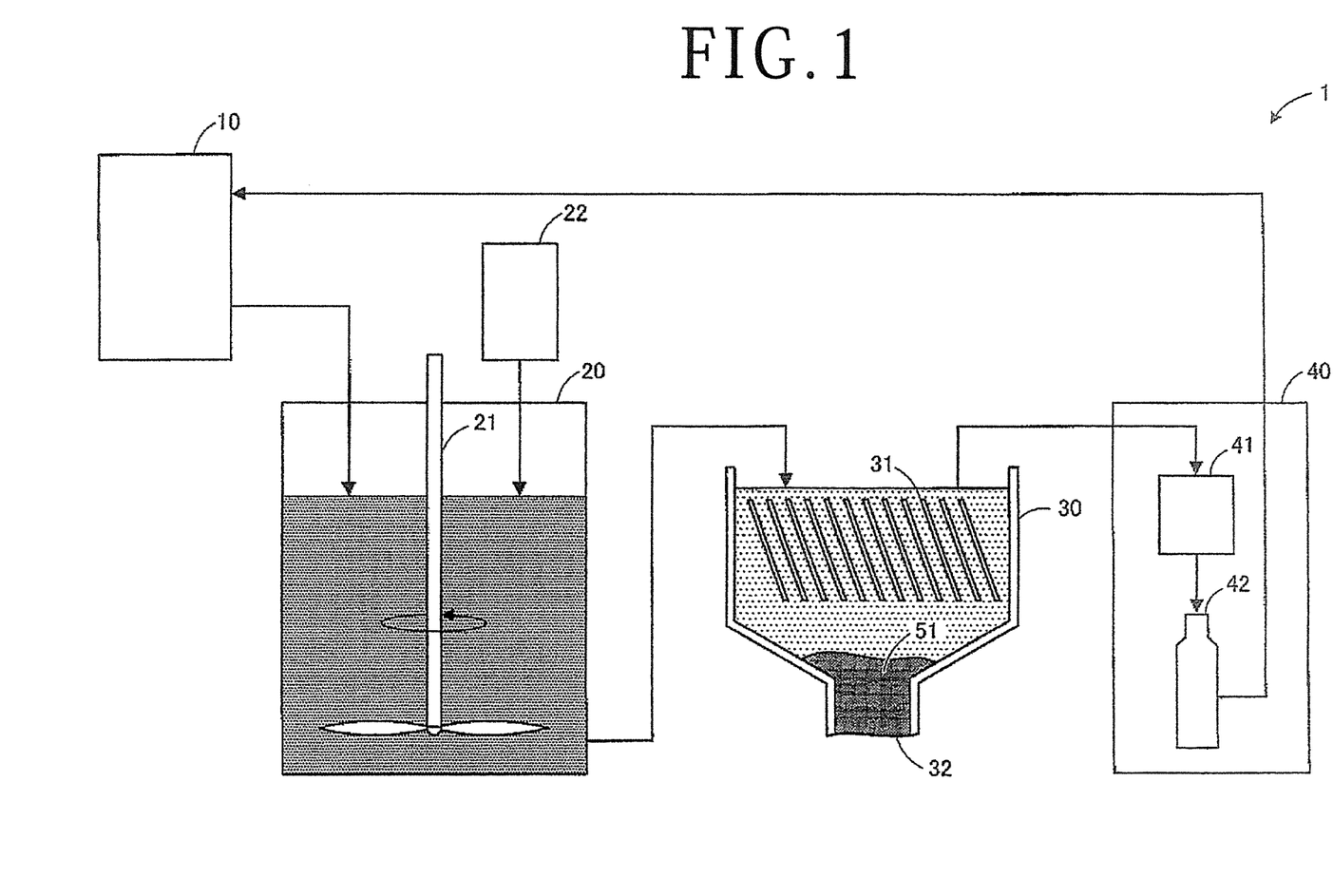
FIG. 1 is a schematic view of a recycle system of pure water according to an embodiment of the present invention.

A recycle system of pure water to which a waste liquid treating method according to an embodiment of the present invention is applied will be described below, referring to the attached drawings. FIG. 1 is a schematic view of the recycle system of pure water according to the present embodiment. As illustrated in FIG. 1, the recycle system 1 is configured such as to recover a processing waste liquid from a processing apparatus 10, purify pure water, and supply the pure water to the processing apparatus 10. In the recycle system 1, the processing waste liquid is discharged from the processing apparatus 10 into a stirring tank 20, in which the processing waste liquid is temporarily reserved. A propeller type stirrer 21 is mounted in the stirring tank 20, and the processing waste liquid discharged from the processing apparatus 10 and a flocculant added from a flocculant supply apparatus 22 are mixed by the stirrer 21 in the stirring tank 20. The flocculant may be manually added to the processing waste liquid by an operator, instead of automatic addition to the processing waste liquid by the flocculant supply apparatus 22.

After the processing waste liquid and the flocculant are stirred in the stirring tank 20, the processing waste liquid is transferred from the stirring tank 20 to a precipitation tank 30 by a pressure feed pump or the like. In the precipitation tank 30, the processing waste liquid is subjected to flocculation and separation into flocculated flocs 51 of processing debris and fresh water, and the flocculated flocs 51 are sedimented in a bottom portion of the precipitation tank 30. The precipitation tank 30 is a so-called inclined plate type precipitation tank, in which precipitation rate is enhanced by shortening the precipitation distance of the flocculated flocs 51 by a multiplicity of inclined plates 31. A discharge port 32 is formed in the center of the bottom portion of the precipitation tank 30, and a bottom portion of the precipitation tank 30 is sloped down toward the discharge port 32. Therefore, the flocculated flocs 51 in the precipitation tank 30 are collected into the discharge port 32.

When fresh water is separated from the processing debris in the precipitation tank 30, the fresh water is transferred from the precipitation tank 30 to a pure water purification apparatus 40 by a pressure feed pump or the like. In the pure water purification apparatus 40, the fresh water passes through a filtration filter 41 and an ion exchange resin filter 42, whereby fine processing debris is removed and deionization is conducted, to purify pure water. Then, the pure water is returned from the pure water purification apparatus 40 to the processing apparatus 10, to be utilized as processing water in the processing apparatus 10. In this way, pure water is purified from the processing waste liquid through the stirring tank 20, the precipitation tank 30, and the pure water purification apparatus 40, and the processing waste liquid discharged from the processing apparatus 10 is reused as processing water in the processing apparatus 10.

Meanwhile, when a processing waste liquid is subjected to flocculation and separation by use of a general flocculant, the fresh water separated from the processing debris would show a raised electric conductivity. Specifically, the processing debris electrified to a minus potential in the processing waste liquid is neutralized by a cation component of the flocculant, to be flocculated, and a component of the flocculant is eluted in the fresh water separated from the processing debris. In this way, although the flocculated flocs 51 can be recovered by the general flocculant, the component of the flocculant increases the electric conductivity to 200 µs/cm or above, thereby worsening water quality. The worsening of water quality by the flocculant is improved by the ion exchange resin filter 42 in the pure water purification apparatus 40, but the ion exchange resin filter 42 is consumed soon, and the frequency of filter replacement is increased.

Thus, in the case where a general flocculant is used, it has been difficult to jointly use both flocculation and pure water recycle. In view of this, in the present embodiment, a material obtained by pulverizing an ion exchange resin used for recycle of pure water down to a size of 100 µm or below is used as a flocculant. Unlike in the case of the general flocculant, elution of a component of the flocculant into the fresh water does not occur, and, therefore, it is possible to subject the processing waste liquid to flocculation and separation into processing debris and fresh water while restraining the rise in electric conductivity of the fresh water separated from the processing debris. In addition, since the rise in electric conductivity is restrained, consumption of the ion exchange resin filter 42 in the pure water purification apparatus 40 at the later stage can be suppressed.

Figure 2:
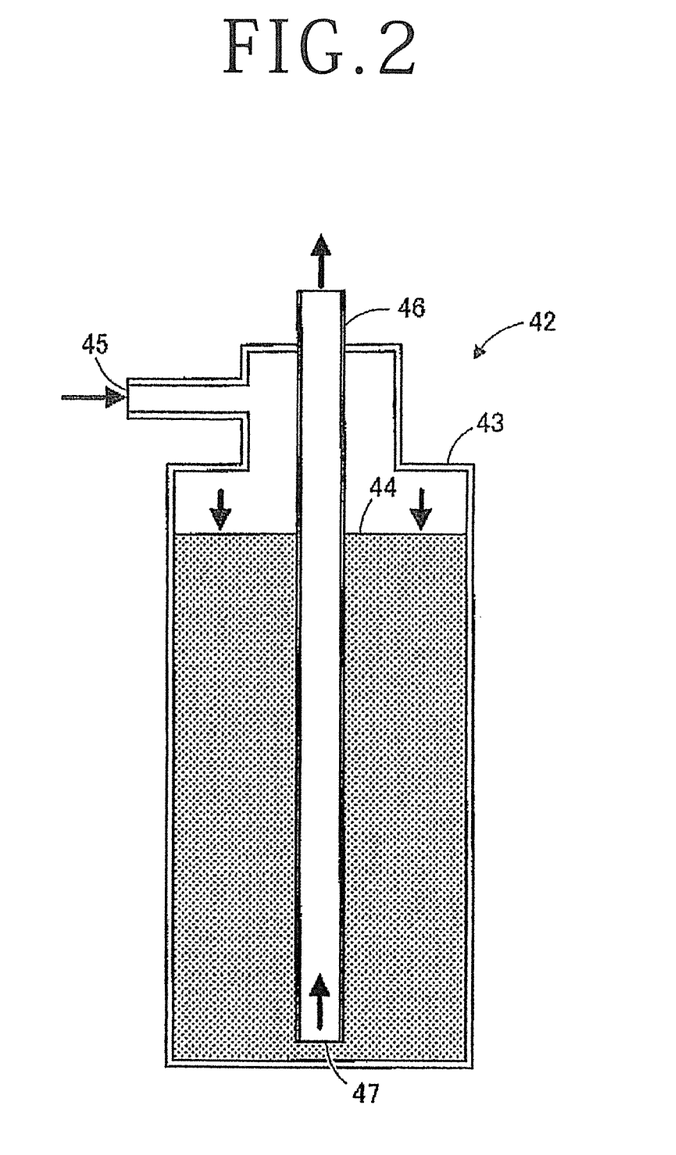
FIG. 2 is a schematic sectional view of an ion exchange resin filter according to the present embodiment.
Figure 3A:
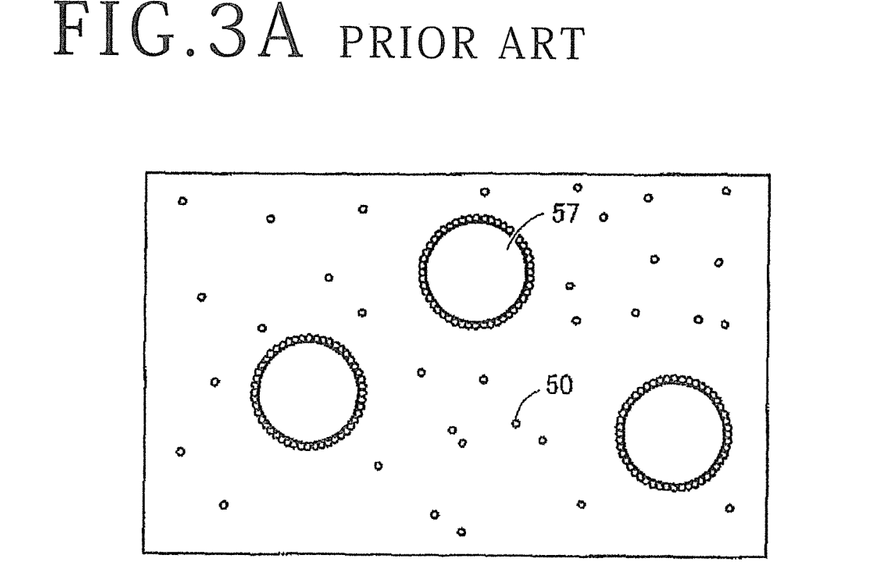
FIGS. 3A and 3B are schematic views of a flocculation treatment.
Figure 3B:
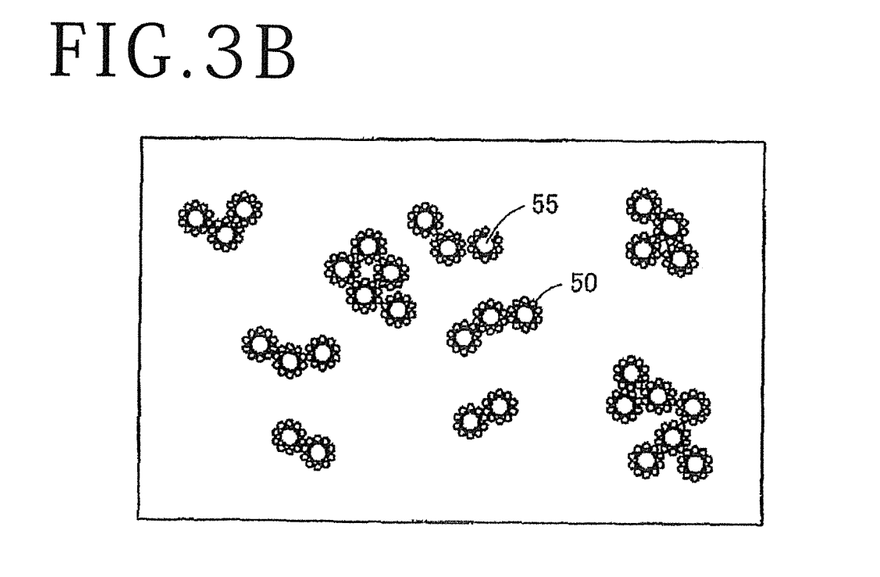

Referring to FIG. 2 and FIGS. 3A and 3B, the ion exchange resin and the flocculant formed using the ion exchange resin will be described. FIG. 2 is a schematic view of the ion exchange resin filter according to the present embodiment. FIGS. 3A and 3B are illustrations of a flocculation treatment according to the present embodiment. FIG. 3A is a figure depicting an example of a flocculation treatment according to a comparative example, and FIG. 3B is a figure depicting an example of the flocculation treatment according to the present embodiment.

As depicted in FIG. 2, the ion exchange resin filter 42 has a housing 43 packed with an ion exchange resin 44. As the ion exchange resin 44, an anion exchange resin and a cation exchange resin are used either singly or as a mixture thereof. For instance, a two-layer structure in which a single layer composed only of an anion exchange resin and a mixed layer of an anion exchange resin and a cation exchange resin are stacked is provided inside the housing 43. Fresh water flows into the ion exchange resin 44 from an inflow port 45 at an upper portion of the housing 43, the fresh water passes through the ion exchange resin 44 to be thereby turned into pure water, which is taken into an outflow port 47 at a lower end of a water collection pipe 46 in the housing 43.

When the fresh water passes through the ion exchange resin 44, anion components of impurities in the fresh water are replaced by hydroxide ions of the anion exchange resin, and cation components of impurities in the fresh water are replaced by hydrogen ions of the cation exchange resin. The hydroxide ions released from the anion exchange resin and the hydrogen ions released from the cation exchange resin combine with each other, to form pure water in a purifying manner. In this way, with the impurities in the fresh water subjected to ion exchange, pure water is purified through removal of the impurities from the fresh water. In the present embodiment, the ion exchange resin 44 for purifying the fresh water into pure water through ion exchange is pulverized down to a size of 100 μm or below, to form the flocculant 55 (see FIG. 3B).

In this case, since processing debris 50 in the processing waste liquid are electrified to minus polarity, an anion exchange resin in which the resin itself is electrified to plus polarity is used as the ion exchange resin 44 for forming the flocculant 55. Since no component of the ion exchange resin 44 is eluted at the time of flocculation and separation of the processing waste liquid, a rise in the electric conductivity of the fresh water is restrained even upon flocculation and separation in the precipitation tank 30 (see FIG. 1). Therefore, even when the fresh water after flocculation and separation passes through the ion exchange resin filter 42, the ion exchange resin filter 42 is not consumed severely, so that it is possible to reduce the frequency of replacement of the ion exchange resin filter 42 and to lighten the work burden on the operator.

Note that while a powdery anion exchange resin has been shown as an example of the flocculant 55 here, a powdery cation exchange resin or a mixed resin of a powdery anion exchange resin and a powdery cation exchange rein may also be used as the flocculant 55, in accordance with the waste liquid. The flocculant 55 is for treating the processing waste liquid having the processing debris 50 mixed in pure water at the time of processing in the processing apparatus into the fresh water, and may be formed in any fashion insofar as it is formed by pulverizing an ion exchange resin.

Here, a flocculation treatment using the ion exchange resin will be described referring to FIGS. 3A and 3B. In the comparative example of FIG. 3A, the flocculation treatment is performed using the ion exchange resin before pulverization as a flocculant 57. Fine processing debris 50 are floating in the processing waste liquid, and the processing debris 50 are electrified to minus polarity and repelling one another. When the flocculant 57 composed of the ion exchange resin of a diameter of 300 μm is put into this liquid, the fine processing debris 50 are adhered to outer surfaces of the flocculant 57. The potential is neutralized by the adhesion of the processing debris 50 to the flocculant 57, but the surface areas of the flocculant 57 are limited, and the amount of neutralization of the potential is slight. Therefore, the processing debris 50 in the processing waste liquid are not flocculated sufficiently, and it is difficult to recover the processing debris 50 from the processing waste liquid.

On the other hand, in the present embodiment depicted in FIG. 3B, the flocculation treatment is performed using a material obtained by pulverizing the ion exchange resin as a flocculant 55. When the fine flocculant 55 composed of the ion exchange resin of a diameter of 100 μm or below is put into the processing waste liquid, the fine processing debris 50 are adhered to outer surfaces of the flocculant 55. Since the flocculant 55 is small in diameter and formed in a powdery form, the surface areas of the flocculant 55 is increased as compared to the surface areas of the flocculant 57 of the comparative example. Therefore, the amount of neutralization of potential in the processing waste liquid is enlarged, flocculation rate is increased, and it is possible to easily recover the processing debris 50 from the processing waste liquid. In addition, since the ion exchange resin is made to be the flocculant 55, there is no variation in electric conductivity, and water quality is stable.

Figure 4A:
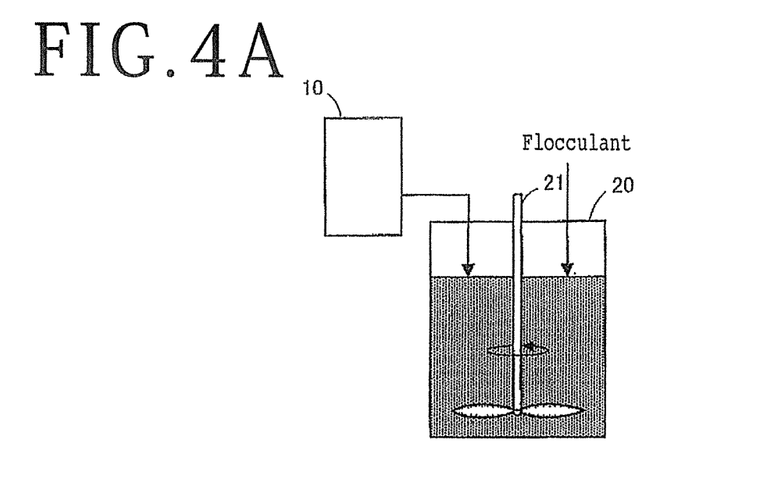
FIGS. 4A to 4D are figures depicting an example of a waste liquid treating method according to the present embodiment.

A waste liquid treating method using an ion exchange resin as a flocculant will be described referring to FIGS. 4A to 4D. FIGS. 4A to 4D are figures depicting an example of the waste liquid treating method according to the present embodiment. As illustrated in FIG. 4A, a flocculant addition step is first conducted. In the flocculant addition step, the processing waste liquid discharged from the processing apparatus 10 (see FIG. 1) is accommodated in the stirring tank 20, and the powdery flocculant 55 (see FIG. 3B) of a diameter of 100 μm or below obtained by pulverizing an ion exchange resin is added to the processing waste liquid in the stirring tank 20. The processing waste liquid has the fine processing debris 50 (see FIG. 3B) dispersed in a colloid form and suspended. In the stirring tank 20, the processing waste liquid and the flocculant 55 are stirred by the propeller type stirrer 21, whereby the flocculant 55 is uniformly mixed in the whole of the processing waste liquid. After the flocculant 55 and the processing waste liquid are sufficiently stirred by the stirrer 21, the processing waste liquid is transferred from the stirring tank 20 to the precipitation tank 30 (see FIG. 4B).

Figure 4B:
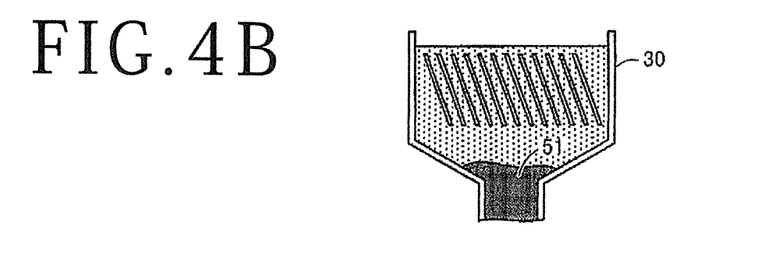

As depicted in FIG. 4B, a solid-liquid separation step is carried out after the flocculant addition step is performed. In the solid-liquid separation step, the processing waste liquid with the flocculant 55 (see FIG. 3B) added thereto is accommodated in the precipitation tank 30, in which the processing waste liquid is separated into the flocculated flocks 51 and fresh water. In this instance, the processing debris 50 (see FIG. 3B) electrified to minus polarity in the processing waste liquid are neutralized by the flocculant 55 (see FIG. 3B) electrified to plus polarity, whereby flocculation is generated. The flocculation of the processing debris causes the flocculated flocks 51 to be precipitated, and the flocculated flocks 51 are deposited from the processing waste liquid containing the flocculated flocks 51 into a bottom portion of the precipitation tank 30. Since the flocculant 55 is made by pulverizing the ion exchange resin into a powdery form, worsening of water quality (a rise in electric conductivity) of the fresh water after the flocculation and separation is restrained.

Figure 4C:
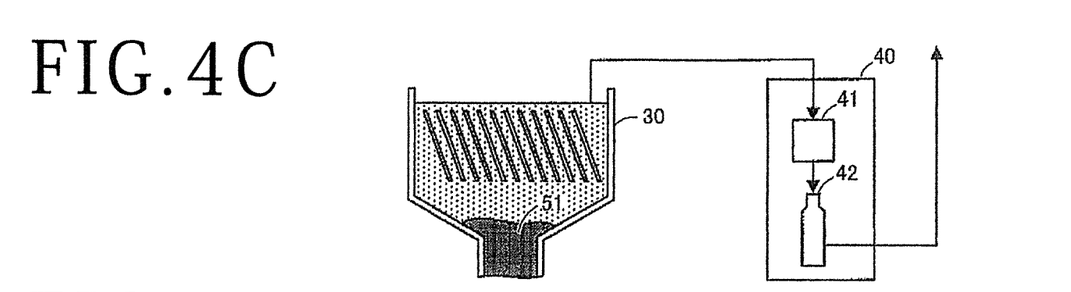

As illustrated in FIG. 4C, a fresh water transfer step is carried out after the solid-liquid separation step is conducted. In the fresh water transfer step, the fresh water separated from the processing debris is transferred to the pure water purification apparatus. In addition, a pure water purification step is carried out after the fresh water transfer step is performed. In the pure water purification step, the fresh water passes through the filtration filter 41 and the ion exchange resin filter 42 in the pure water purification apparatus 40, whereby pure water is purified from the fresh water. Since the worsening of water quality of the fresh water after the flocculation and separation is restrained in the solid-liquid separation step at the preceding stage, consumption of the ion exchange resin filter 42 is restrained.

Figure 4D:
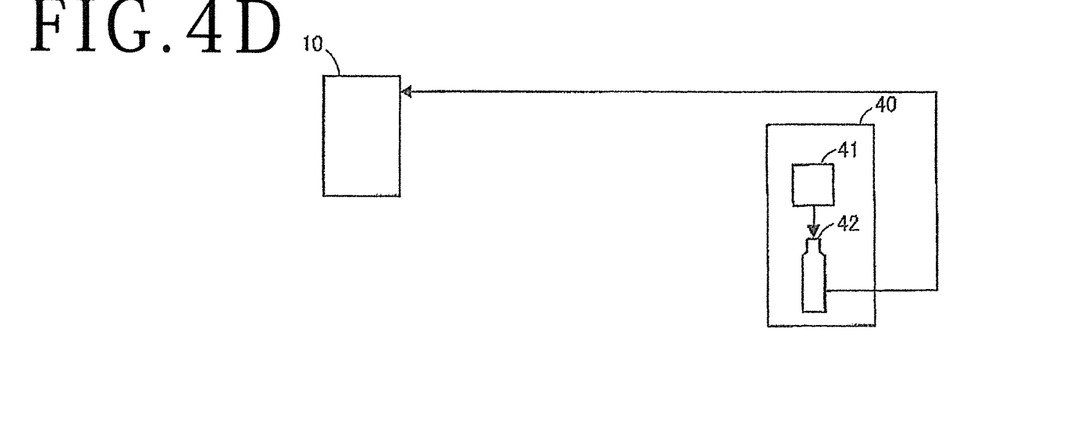

As depicted in FIG. 4D, a pure water transfer step is carried out after the pure water purification step is conducted. In the pure water transfer step, the pure water purified in the pure water purification apparatus 40 is transferred to the processing apparatus. In this way, the pure water is purified from the processing waste liquid in which the processing debris is mixed into pure water at the time of processing in the processing apparatus 10, and the thus purified pure water is reused as processing water in the processing apparatus 10. As has been described above, the material obtained by pulverizing an ion exchange resin to a size of 100 μm or below is used as the flocculant 55 (see FIG. 3B), whereby joint use of flocculation of processing debris and recycle of pure water, which has been difficult to achieve due to worsening of water quality in the case of using a general flocculant, is realized.

As aforementioned, according to the present embodiment, the ion exchange resin for purification of fresh water into pure water is pulverized to be used as the flocculant 55, whereby no component of the flocculant 55 is eluted into the fresh water. Therefore, even when the processing waste liquid is subjected to flocculation and separation before returning it to the pure water purification apparatus 40, the fresh water separated from the processing debris does not show an increased electric conductivity, and consumption of the ion exchange resin filter 42 in the pure water purification apparatus 40 can be restrained. In addition, since the flocculant 55 has been pulverized down to the size of 100 μm or below, flocculation of the processing debris can be promoted.

In the above-described embodiment, the processing debris are removed by the filtration filter, and deionization is performed by the ion exchange resin filter. Therefore, the filtration filter and the ion exchange resin filter need respective replacement works, which is troublesome for the operator, and it is desired to unify the filters. Here, when the present applicant has mixed a flocculant obtained by pulverizing an ion exchange resin into an ion exchange resin of an ion exchange resin filter, it has been found out that the ion exchange resin filter can function also as a filtration filter favorably.

Figure 5:
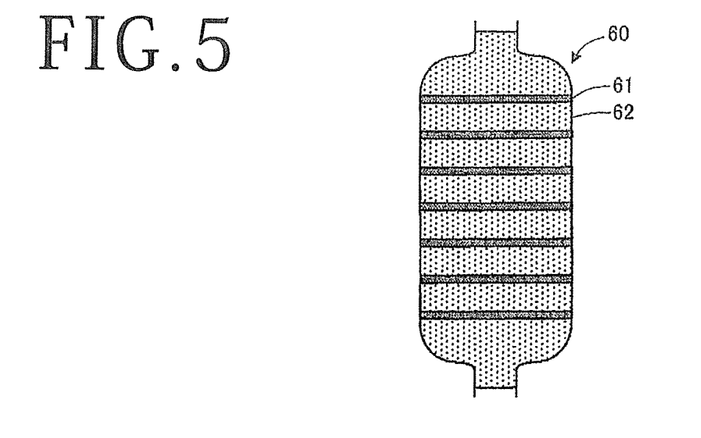
FIG. 5 is a schematic view depicting an example of an ion exchange resin filter according to a modification.
Figure 6:
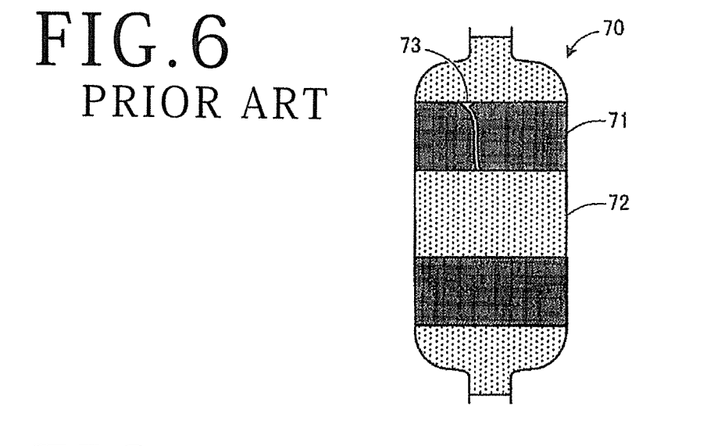
FIG. 6 is a schematic view depicting an ion exchange resin filter according to a comparative example.
Figure 7:
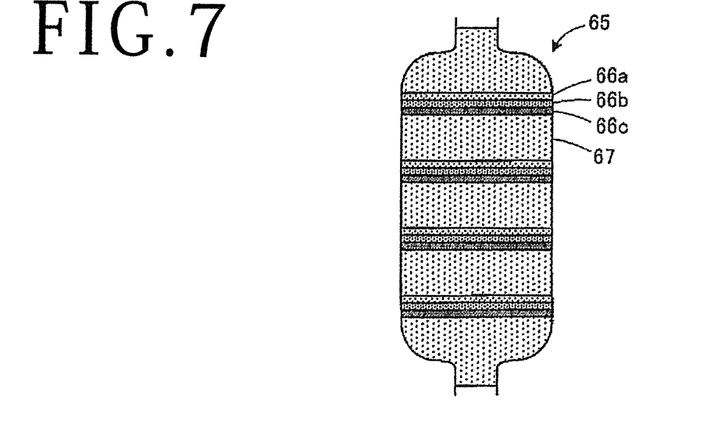
FIG. 7 is a schematic view depicting an ion exchange resin filter according to another modification.

Ion exchange resin filters according to modifications will be described referring to FIGS. 5 to 7. FIG. 5 is a schematic view depicting an ion exchange resin filter according to a modification. FIG. 6 is a schematic view depicting an ion exchange resin filter according to a comparative example. FIG. 7 is a schematic view depicting an ion exchange resin filter according to another modification.

As illustrated in FIG. 5, an ion exchange resin filter 60 is a filter for subjecting a processing waste liquid to filtration and ion exchange to purify the processing waste liquid into pure water, and is formed to have a configuration wherein a mixed layer 61 in which a flocculant obtained by pulverizing an ion exchange resin is mixed into an ion exchange resin and an ion exchange resin layer 62 composed of an ion exchange resin are alternately stacked. Each mixed layer 61 has the flocculant uniformly dispersed in the ion exchange resin, and it filtrates the processing waste liquid and subjects the processing waste liquid to flocculation and separation into processing debris and fresh water. Each ion exchange resin layer 62 functions to perform removal of fine processing debris and deionization, whereby the fresh water filtered by the mixed layer 61 is purified into pure water. Since no component of the ion exchange resin is eluted at the time of flocculation and separation, even when the processing waste liquid passes through the mixed layer 61, the ion exchange resin layer 62 is not consumed severely.

Note that the flocculant is formed to have a diameter of 30 to 100 μm, whereas the ion exchange resin is formed to have a diameter of 300 μm. As the flocculant is formed to be finer, the flocculation effect is enhanced. In the mixed layers 61, the flocculant is preferably contained in a concentration of 5% to 50% based on the ion exchange resin, more preferably in a concentration of 20% based on the ion exchange resin. With the flocculant contained in a concentration of 20% based on the ion exchange resin, a sufficient flocculation effect can be obtained, and worsening of water quality can be restrained. In addition, if the mixed layers 61 are too thick, the processing waste liquid would not be filtered favorably; therefore, the mixed layers 61 are preferably formed to be thin to such an extent that the processing waste liquid can be filtered thereby.

Specifically, when mixed layers 71 of an ion exchange resin filter 70 are formed to be thick, as in the comparative example depicted in FIG. 6, passage of the processing waste liquid through the mixed layer 71 leads to flocculation starting from the flocculant on the upper side of the mixed layer 71. Before the processing waste liquid is distributed throughout the mixed layer 71 to complete total flocculation, flocculation progresses excessively at part of the mixed layer 71, with the result of formation of a hole 73. The hole 73 grows downward to penetrate the mixed layer 71, and the processing waste liquid passes through the hole 73 in the mixed layer 71 to flow into an ion exchange resin layer 72. Therefore, since the processing waste liquid is not filtered by the mixed layers 71, water quality of the processing waste liquid would be worsened, and the ion exchange resin layers 72 would be easily clogged with processing debris.

In view of this, as depicted in FIG. 5, in the ion exchange resin filter 60, the mixed layers 61 are formed to be thin by increasing the number of the mixed layers 61, instead of forming the mixed layers 61 in a thick form. By this, the processing waste liquid can be uniformly distributed throughout the mixed layers 61, and can be filtered favorably. Therefore, the mixed layers 61 are preferably formed in such a thickness that the processing waste liquid is distributed throughout the mixed layers 61 before formation of a hole in the mixed layers 61. With the ion exchange resin filter 60 provided with a function for flocculation of the processing waste liquid and a function for pure water purification, a filter replacing work can be finished by only one-time operation, whereby work burden on the operator can be lessened.

In addition, as depicted in FIG. 7, each of mixed layers 66 of an ion exchange resin filter 65 may be packed with a flocculant in such a manner that the flocculant content gradually increases along the direction from the inflow side toward the outflow side of the processing waste liquid. For example, a three-layer structure may be adopted in which a plurality of mixed layers 66a to 66c having respective flocculant contents of 5%, 10%, and 20% based on the ion exchange resin are sequentially formed in this order from the inflow side toward the outflow side of the processing waste liquid. Where the plurality of mixed layers 66a to 66c differing in flocculant content are thus stacked, the processing waste liquid can be favorably filtered and supplied to each of ion exchange resin layers 67. Note that each of the mixed layers 66a to 66c is preferably formed in such a thickness that the processing waste liquid is uniformly distributed throughout the mixed layers 66a to 66c before formation of a hole in the mixed layers 66a to 66c.

Note that in the present embodiment, the processing apparatus is not limited to a cutting apparatus and a grinding apparatus. The present invention is applicable also to other processing apparatuses in which processing is conducted using pure water. The present invention may be applied to a cutting apparatus, a grinding apparatus, a polishing apparatus, an edge trimming apparatus, and other processing apparatuses such as a cluster apparatus including the just-mentioned apparatuses. Besides, while the stirring tank and the precipitation tank have been separate bodies in the present embodiment, this configuration is not limitative. The stirring tank and the precipitation tank may be formed as an integral body.

In addition, as a work to be processed by the processing apparatus, there may be used various works such as a semiconductor substrate, an inorganic material substrate, and a package substrate. As the semiconductor substrate, there may be used various substrates of silicon, gallium arsenide, gallium nitride, silicon carbide or the like. As the inorganic material substrate, there may be used various substrates of sapphire, ceramic, glass or the like. The semiconductor substrate and the inorganic material substrate may be formed with devices, or may not be formed with devices. As the package substrate, there may be used various substrates for chip size package (CSP), wafer level chip size package (WLCSP), electromagnetic interference (EMI), system in package (SIP), or fan out wafer level package (FOWLP). Besides, as the work, there may be used lithium tantalate, lithium niobate, and, further, green ceramics and piezoelectric elements, after or before device formation.

Besides, the embodiment and modifications of the present invention are not limited to the above-described modes, and various changes, replacements and modifications may be made without departing from the scope of the gist of the technical thought of the present invention. Further, if the technical thought of the present invention can be realized in other ways in accordance with the progress of technology or derived other technologies, the invention may be carried out by the relevant method. Therefore, the claims cover all the embodiments which can be included within the scope of the technical thought of the present invention.

In addition, while a configuration in which the present invention is applied to recycle of pure water has been described in the present embodiment, the invention is also applicable to a configuration in which pure water is purified from tap water or industrial water.

As has been described above, the present invention has an effect of making it possible to purify pure water while suppressing consumption of a filter, even in the case of a processing waste liquid high in the concentration of processing debris, and is particularly effective for a flocculant, a filter, and a waste liquid treating method for flocculation and separation of a processing waste liquid.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A waste liquid treating method for purifying a processing waste liquid, in which processing debris generated by processing are mixed in pure water supplied at a time of processing by a processing apparatus, into pure water, the waste liquid treating method comprising:
   a flocculant addition step of adding a flocculant obtained by pulverizing an ion exchange resin for purification of fresh water into pure water to a size of 100 μm or below to a stirring tank in which a processing waste liquid discharged from the processing apparatus is accommodated;
   a solid-liquid separation step of separating the processing waste liquid containing flocculated flocs of the processing debris flocculated by the flocculant into the flocculated flocs and fresh water in a precipitation tank having a plurality of inclined plates, after the flocculant addition step is performed, wherein a rate of precipitation of the flocculated flocs is enhanced by said inclined plates;
   a fresh water transfer step of transferring the fresh water separated in the solid-liquid separation step to a pure water purification apparatus;
   a pure water purification step of purifying the fresh water transferred in the fresh water transfer step into pure water in the pure water purification apparatus; and
   a pure water transfer step of transferring the pure water purified in the pure water purification step to the processing apparatus.

2. The waste liquid treating method according to claim 1, wherein the pure water purification step includes passing the fresh water through an ion exchange filter having mixed layers and ion exchange resin layers that are alternately stacked, wherein each of the mixed layers includes a flocculant obtained by pulverizing an ion exchange resin to a size of 100 μm or below mixed into an ion exchange resin, and wherein a thickness of each of the mixed layers is less than a thickness of each of the ion exchange resin layers.

3. The waste liquid treating method according to claim 2, wherein the mixed layers are formed by packing the flocculant in such a manner that a content of the flocculant gradually increases in each successive mixed layer.

4. A waste liquid treating method for purifying a processing waste liquid, in which processing debris generated by processing are mixed in pure water supplied at a time of processing by a processing apparatus, into pure water, the waste liquid treating method comprising:
   a flocculant addition step of adding a flocculant obtained by pulverizing an ion exchange resin for purification of fresh water into pure water to a size of 100 μm or below to a stirring tank in which a processing waste liquid discharged from the processing apparatus is accommodated;
   a solid-liquid separation step of separating the processing waste liquid containing flocculated flocs of the processing debris flocculated by the flocculant into the flocculated flocs and fresh water in a precipitation tank, after the flocculant addition step is performed;
   a fresh water transfer step of transferring the fresh water separated in the solid-liquid separation step to a pure water purification apparatus;
   a pure water purification step of purifying the fresh water transferred in the fresh water transfer step into pure water in the pure water purification apparatus, wherein the pure water purification step includes passing the fresh water through an ion exchange filter having mixed layers and ion exchange resin layers that are alternately stacked, wherein each of the mixed layers includes a flocculant obtained by pulverizing an ion exchange resin to a size of 100 μm or below mixed into an ion exchange resin, wherein a thickness of each of the mixed layers is less than a thickness of each of the ion exchange resin layers; and
   a pure water transfer step of transferring the pure water purified in the pure water purification step to the processing apparatus.

5. The waste liquid treating method according to claim 4, wherein the mixed layers are formed by packing the flocculant in such a manner that a content of the flocculant gradually increases in each successive mixed layer.

* * * * *